United States Patent [19]

Buck

[11] Patent Number: 4,817,179
[45] Date of Patent: Mar. 28, 1989

[54] DIGITAL IMAGE ENHANCEMENT METHODS AND APPARATUS

[75] Inventor: Daniel M. Buck, Glastonbury, Conn.

[73] Assignee: Scan-Optics, Inc., East Hartford, Conn.

[21] Appl. No.: 946,798

[22] Filed: Dec. 29, 1986

[51] Int. Cl.⁴ .......................... G06K 9/40; G06K 9/20; G06K 9/68

[52] U.S. Cl. ........................................ 382/54; 382/34; 382/61

[58] Field of Search .................... 382/30, 34, 41, 42, 382/54, 61; 358/166, 167, 284, 282

[56] References Cited

U.S. PATENT DOCUMENTS

| | | | |
|---|---|---|---|
| 4,290,049 | 9/1981 | Sternberg et al. | 382/54 |
| 4,461,029 | 7/1984 | Van Bilzem et al. | 382/54 |
| 4,468,809 | 8/1984 | Grabowski et al. | 382/34 |
| 4,623,923 | 11/1986 | Orbach | 382/34 |
| 4,628,532 | 12/1986 | Stone et al. | 382/21 |
| 4,630,308 | 12/1986 | Hongo | 382/34 |

Primary Examiner—James J. Groody
Assistant Examiner—Michael D. Parker
Attorney, Agent, or Firm—Chilton, Alix & Van Kirk

[57] ABSTRACT

Digital matrices, for example digitized images, are enhanced by comparing a matrix to be enhanced with plural enhancement patterns for each position in the matrix of each element of the matrix to produce pattern codes commensurate with the matches with the enhancement patterns. The pattern codes are employed to generate plural enhancement decisions for each element of the matrix and these enhancement decisions are combined to provide a single enhancement action for each element of the matrix.

17 Claims, 10 Drawing Sheets

NUMERIC

ALPHA

ALPHANUMERIC

NUMERIC
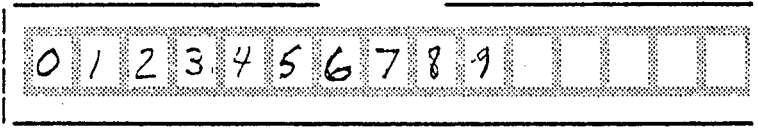
ALPHA
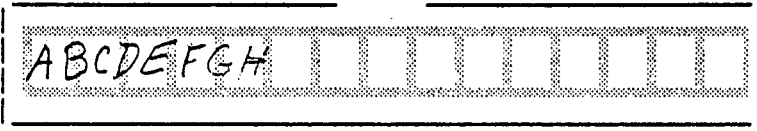
ALPHANUMERIC
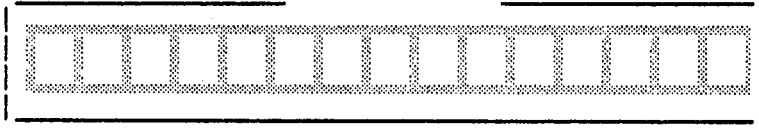
FIG. 1

```
PATTERN 0 = 1 BLACK
-------------------
    0   1   2   3   4   5   6   7
   ---------------------------------
0  |   |   |   |   |   |   |   |   |
   ---------------------------------
1  |   |   |   |   |   |   |   |   |
   ---------------------------------
2  |   |   |   |   |   |   |   |   |
   ---------------------------------
3  |   |   |   | W | W | W |   |   |
   ---------------------------------
4  |   |   |   | W |   | W |   |   |
   ---------------------------------
5  |   |   |   | W | W | W |   |   |
   ---------------------------------
6  |   |   |   |   |   |   |   |   |
   ---------------------------------
7  |   |   |   |   |   |   |   |   |
   ---------------------------------
```

FIG. 5A

```
PATTERN 1 = 4 BLACK
-------------------
    0   1   2   3   4   5   6   7
   ---------------------------------
0  |   |   |   |   |   |   |   |   |
   ---------------------------------
1  |   |   |   |   |   |   |   |   |
   ---------------------------------
2  |   |   | W | W | W | W |   |   |
   ---------------------------------
3  |   |   | W |   |   | W |   |   |
   ---------------------------------
4  |   |   | W |   |   | W |   |   |
   ---------------------------------
5  |   |   | W | W | W | W |   |   |
   ---------------------------------
6  |   |   |   |   |   |   |   |   |
   ---------------------------------
7  |   |   |   |   |   |   |   |   |
   ---------------------------------
```

FIG. 5B

```
PATTERN 2 = 5 BLACK
-------------------
    0   1   2   3   4   5   6   7
   ---------------------------------
0  |   |   |   |   |   |   |   |   |
   ---------------------------------
1  |   |   |   |   |   |   |   |   |
   ---------------------------------
2  |   |   |   | W | W | W |   |   |
   ---------------------------------
3  |   |   | W | W |   | W | W |   |
   ---------------------------------
4  |   |   | W |   |   |   | W |   |
   ---------------------------------
5  |   |   | W | W |   | W | W |   |
   ---------------------------------
6  |   |   |   | W | W | W |   |   |
   ---------------------------------
7  |   |   |   |   |   |   |   |   |
   ---------------------------------
```

FIG. 5C

```
PATTERN 3 = 9 BLACK
-------------------
    0   1   2   3   4   5   6   7
   ---------------------------------
0  |   |   |   |   |   |   |   |   |
   ---------------------------------
1  |   |   |   |   |   |   |   |   |
   ---------------------------------
2  |   |   | W | W | W | W | W |   |
   ---------------------------------
3  |   |   | W |   |   |   | W |   |
   ---------------------------------
4  |   |   | W |   |   |   | W |   |
   ---------------------------------
5  |   |   | W |   |   |   | W |   |
   ---------------------------------
6  |   |   | W | W | W | W | W |   |
   ---------------------------------
7  |   |   |   |   |   |   |   |   |
   ---------------------------------
```

FIG. 5D

CONVERT PATTERN WANTED INTO PROM ADDRESSES

```
W       = WHITE         ADR BIT =   0
B       = BLACK         ADR BIT =   1
X or (b) = DON'T CARE   ADR BIT =   0 and 1
```

PATTERN WANTED                                          PROM ADDRESSES

```
0 |   |   |   |   |   |   |   |   |    ---------   0   X  X  X  X  X  X  X  X

1 |   |   | W | W | W | W | W |   |    ---------   1   X  X  0  0  0  0  0  X

2 |   | W | W |   |   |   | W | W |    ---------   2   X  0  0  X  X  X  0  0

3 |   | W |   | B | B | B |   | W |    ---------   3   X  0  X  1  1  1  X  0

4 |   | W |   | B | B | B |   | W |    ---------   4   X  0  X  1  1  1  X  0

5 |   | W |   | B | B | B |   | W |    ---------   5   X  0  X  1  1  1  X  0

6 |   | W | W |   |   |   | W | W |    ---------   6   X  0  0  X  X  X  0  0

7 |   |   | W | W | W | W | W |   |    ---------   7   X  X  0  0  0  0  0  X
```

1. ASSIGN PROM DATA BIT TO PATTERN (BIT 0 FOR PATTERN 0, ETC.)
2. CALCULATE ADDRESSES WHICH WILL PRODUCE A PATTERN MATCH.

```
PROM 0                PROMS 1 + 7           PROMS 2 + 6           PROMS 3, 4 + 5
--------------        --------------        --------------        --------------

XXXXXXXX = ADR        XX00000X = ADR        X00XXX00 = ADR        X0X111X0 = ADR

00000000 = 000        00000000 = 000        00000000 = 000        00011100 = 034
00000001 = 001        00000001 = 001        00000100 = 004        00011110 = 036
00000010 = 002        01000000 = 100        00001000 = 010        00111100 = 074
00000011 = 003        01000001 = 101        00001100 = 014        00111110 = 076
      •               10000000 = 200              •               10011100 = 234
      •               10000001 = 201              •               10011110 = 236
      •               11000000 = 300              •               10111100 = 274
11111111 = 377        11000001 = 301        10011100 = 234        10111110 = 276
```

3. SET DATA BIT TO 0 AT ALL CALCULATED ADDRESSES (FOR PATTERN MATCH).
4. SET DATA BIT TO 1 AT ALL OTHER ADDRESSES (FOR NO PATTERN MATCH).

FIG. 6

PATTERN MATCHING OPERATION - USING 8, 256 X 8 PROMS 8, 8-BIT VIDEO DATA BYTES = 8, 8-BIT ADDRESS TO 8, 256 X 8 PROMS

```
    PROM ADDRESSES                        PROM DATA
     (VIDEO DATA)                 (AT MATCH ADR FOR PATTERN 0)

B7 B6 B5 B4 B3 B2 B1 B0              P7 P6 P5 P4 P3 P2 P1 P0
   -----------------------              -----------------------
0 |  |  |  |  |  |  |  |  |   -----   0 |  |  |  |  |  |  |  |0 |
   -----------------------              -----------------------        L
1 |  |  |0 |0 |0 |0 |0 |  |   -----   1 |  |  |  |  |  |  |  |0 |     O
   -----------------------              -----------------------        G
2 |  |0 |0 |  |  |0 |0 |  |   -----   2 |  |  |  |  |  |  |  |0 |     I
   -----------------------              -----------------------        C
3 |  |0 |  |1 |1 |1 |  |0 |   -----   3 |  |  |  |  |  |  |  |0 |     A
   -----------------------              -----------------------        L
4 |  |0 |  |1 |1 |1 |  |0 |   -----   4 |  |  |  |  |  |  |  |0 |
   -----------------------              -----------------------        O
5 |  |0 |  |1 |1 |1 |  |0 |   -----   5 |  |  |  |  |  |  |  |0 |     R
   -----------------------              -----------------------
6 |  |0 |0 |  |  |0 |0 |  |   -----   6 |  |  |  |  |  |  |  |0 |
   -----------------------              -----------------------
7 |  |  |0 |0 |0 |0 |0 |  |   -----   7 |  |  |  |  |  |  |  |0 |
   -----------------------              -----------------------

PATTERN ENABLE BITS ---------         |1 |1 |1 |1 |1 |1 |1 |0 |
     (FROM 28)                         -----------------------

PATTERN MATCH RESULT --------         |1 |1 |1 |1 |1 |1 |1 |0 |
                                       -----------------------        V
```

PATTERN MATCH DEFINITION
-----------------------

1. IF RESULT BIT = 0 THEN PATTERN MATCHES.

2. IF RESULT BIT NOT = 0 THEN PATTERN DOES NOT MATCH OR IS DISABLED.

3. IF NO PATTERN MATCHES THEN NO ENHANCEMENT WILL TAKE PLACE.

4. IF ONE OR MORE PATTERNS MATCH THEN THE ENHANCEMENT DESIGNATED BY THE HIGHEST (MOST ENCLUSIVE) PATTERN NUMBER WILL BE USED.

FIG. 7

PATTERN 0 = 1 BLACK

PATTERN 1 = 4 BLACK

PATTERN 2 = 5 BLACK

PATTERN 3 = 9 BLACK

DIGITAL IMAGE ENHANCEMENT METHODS AND APPARATUS

BACKGROUND OF THE INVENTION

I. Field of the Invention

The present invention relates to the conversion of digital matricies, especially matricies which correspond to digitized images, and particularly to the high speed machine reading of indicia such as, by way of example only, characters printed within fields delimited by guides which are visible to optical character recognition apparatus. More specifically, this invention is directed to apparatus which enables optical character recognition equipment to recognize and encode indicia, small artifacts such as dots for example, and to take a predetermined conversion action commensurate with the recognized indicia. Accordingly, the general objects of the present invention are to provide novel and improved methods and apparatus of such character.

II. Brief Description of the Prior Art

While not limited thereto in its utility, the present invention is particularly well suited for use with commercially available optical character recognition (OCR) apparatus having the ability to "read" hand-printed characters in real time, i.e., at high speed, and with very low rejection rates. An example of such optical character recognition apparatus is disclosed in U.S. Pat. No. 4,628,532. In order to enable the machine reading of data imprinted on a document by means of a visible medium, the location and size of the characters comprising such data must meet certain criteria. Thus, each character must be positioned substantially entirely within a locatable "field" and there must be a relatively high degree of contrast between the character and background. Where the data is to be entered by hand, such fields are customarily defined by printed data entry guides. Since optical character recognition apparatus operates by detecting the variations in contrast between the characters to be recognized and the background, it has been common practice to employ "drop-out" colors, i.e., colors which are invisible to the OCR equipment, to define the fields. In theory, employment of such "drop-out boxes" ensures proper sizing and positioning of hand printed data entries. The use of "drop-out" colors requires the capability of printing the documents upon which the data is to be entered in at least two colors and this significantly increases the cost of such documents. Further, the need to employ "drop-out" colors greatly increases the difficulty of changing forms upon which data is to be entered by hand.

Continuing the above discussion, and employing machine readable tax forms as an example, each year the text and format of many standard tax forms and the forms employed by accountants to solicit taxpayer information must be changed. In addition, it is often desirable that sets of such forms be assembled on the basis of individual requirements. The preparation of such pre-printed forms employing "drop-out boxes" has been a relatively expensive task and the collation of individual forms to produce sets customized for particular individuals has been a time-consuming task.

The recent commercial availability of high-speed Laser printers provides the ability to create complete forms on blank paper in a single pass. While these forms can include graphics, including guides for data entry, currently available Laser printers cannot produce such guides in "drop-out" colors.

It is also to be noted that there has been a long-standing need for a means of converting input pixel patterns, commensurate with a scanned image, to other patterns in real time and with modest cost. While pixel pattern enhancement of satellite acquired images is known, the available equipment and techniques for such pattern enhancement are very expensive and complex and process data at a very slow rate.

SUMMARY OF THE INVENTION

The present invention provides the capability of converting any digital matrix of information into any other matrix at extremely high speed; i.e., in real time. This conversion capability, for example, enables the utilization of computer controlled printers with graphics options to produce OCR readable forms wherein data entry guides are printed with OCR visible ink, i.e., as a result of the conversion the reading of characters entered within such OCR visible guides by the OCR equipment will not be significantly impeded by the guides. In accordance with a first embodiment of the invention, data entry guides printed with OCR visible ink, and characters having substantially the same contrast relative to a background as the guides, are digitized and the resulting digital matricies are subjected to an enhancement procedure As a result of such enhancement, the enhancement consisting of digital matrix conversion, the guides will not be interpreted as part of a character to be recognized and thus will not degrade the recognition performance of the OCR equipment. The present invention may, for example, also be employed to enhance the edges of a pattern or to reduce a segment of a line comprising a pattern to a single bit.

In accordance with the said first embodiment of the invention, the data entry fields are in the form of open, rectangular boxes having their outer boundaries defined by a row or plural rows of dots. A data entry field which includes such "drop-out" box defining indicia will comprise a predetermined number of rows of pixels arranged in columns and each boundary defining dot will be located in a pixel.

Apparatus in accordance with the first preferred embodiment of the present invention processes a serial stream of digitized data, for example video data from an image disector tube, and operates to remove small artifacts from the input image. Thus, when a "drop-out" box is defined by dots, the present invention will remove such dots from the image data before such data is passed on to the character recognition logic.

Also in accordance with the preferred embodiment, pattern data and enhancement action data are separately stored to allow for customized pattern and enhancement mixes. In one reduction to practice, fifteen different patterns were defined and, as a result of matching these patterns, four different enhancement, i.e., matrix conversion, actions could be selected.

BRIEF DESCRIPTION OF THE DRAWING

The present invention may be better understood, and its numerous objects and advantages will become apparent to those skilled in the art, by reference to the accompanying drawing in which:

FIG. 1 depicts handprint guides which, in accordance with the invention, may be digitized and the resulting digital matricies converted such that only the alphanumeric data appearing within the guide boxes will be supplied to optical character recognition logic;

FIG. 2A is a representation of digitized image data resulting from the scanning of a portion of the "AL-PHA" guide of FIG. 1, the image data of FIG. 2A being inputted to the present invention;

FIG. 2B is a representation of the image data of FIG. 2A after enhancement in accordance with the present invention;

FIGS. 5A-5D represent sample data patterns which are to be matched employing the embodiment of FIG. 4;

FIG. 6 is a diagramatic explanation of the manner of converting pattern data to addresses in accordance with the present invention;

FIG. 7 is a diagrammatic explanation of a pattern matching operation in accordance with the present invention; and FIGS. 8A-8D represent enhancement patterns which will be generated in accordance with the preferred embodiment.

DESCRIPTION OF THE DISCLOSED EMBODIMENT

For purposes of explanation, the present invention will be described as an option which may be employed with the optical character recognition apparatus of above-referenced U.S. Pat. No. 4,628,532. The invention will impart, to the apparatus of the referenced patent, the ability to "read" characters printed in forms created by Laser printers. A portion of such a form, comprising three parallel rows of guide boxes, is depicted in FIG. 1. The guide boxes are defined by dots and, in the example of FIG. 1, the Laser printer generated 300 dots per inch. FIG. 1 also shows sample data which has been printed by hand "within" several of the guide boxes.

Figure 2A:
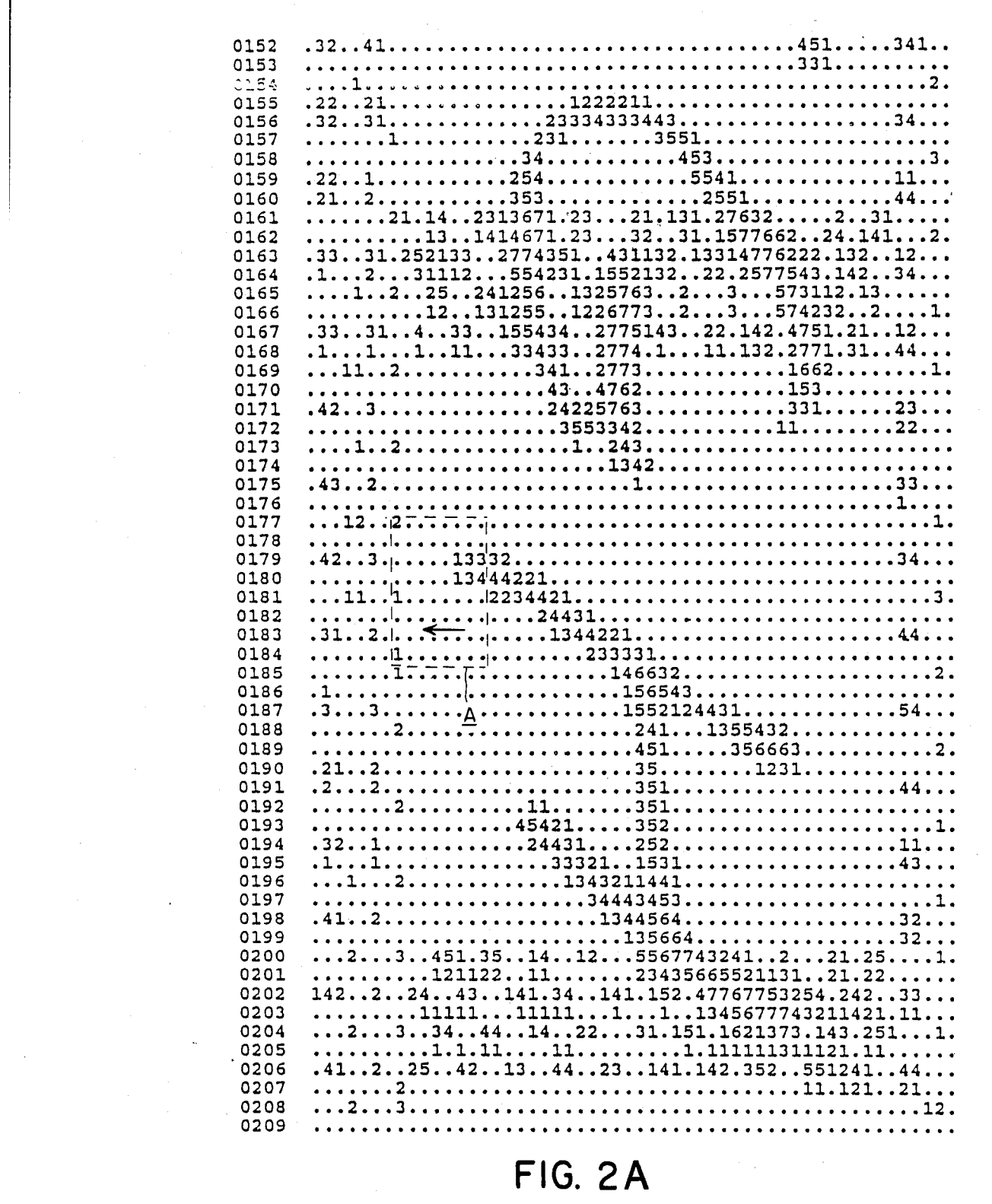

The analog video data, which appears at the output of the device which scans the document to be read, will be digitized so that each pixel will comprise a three bit word commensurate with the gray scale value of the pixel. The scanner device may, for example, comprise an image dissector tube or a charge coupled solid state device. In OCR apparatus, the image is customarily scanned top to bottom and the scan line is shifted one pixel to the right after each such "vertical" scan. A single scan line may, depending on the nature of the scanner device, consist of 64 or more pixels. FIG. 2A is a representation of digitized sample video data, with the degree of darkness of each pixel on a gray scale of 1 to 7 being indicated, resulting from the scan of a portion of the ALPHA handprint guide shown in FIG. 1. The scanned field includes the guide box having the character "H" hand-printed therein and also including a portion of the adjacent guide box with the overlapping character "G".

Figure 3:
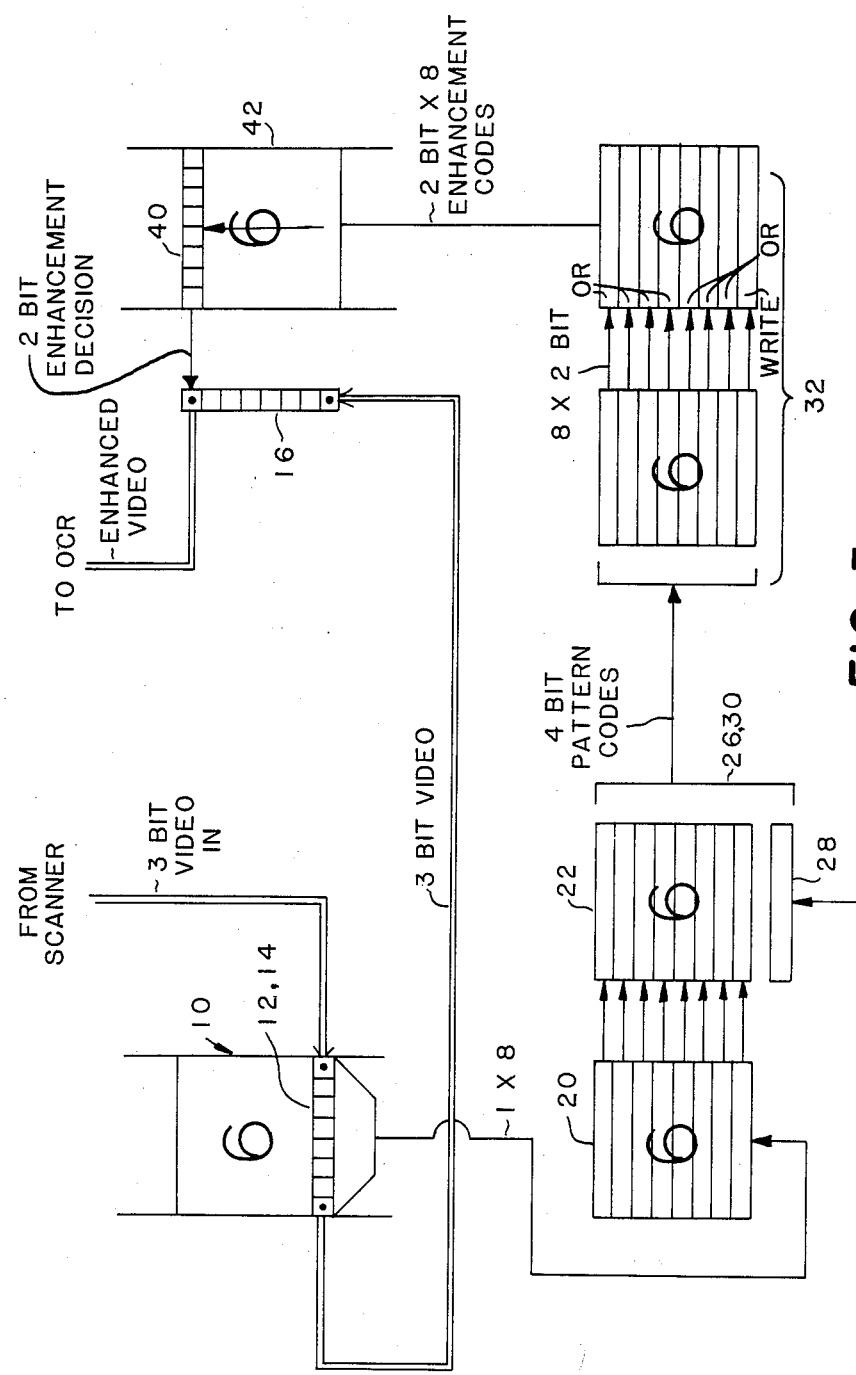
FIG. 3 is a flow diagram for image data in accordance with the present invention.
Figure 4A:
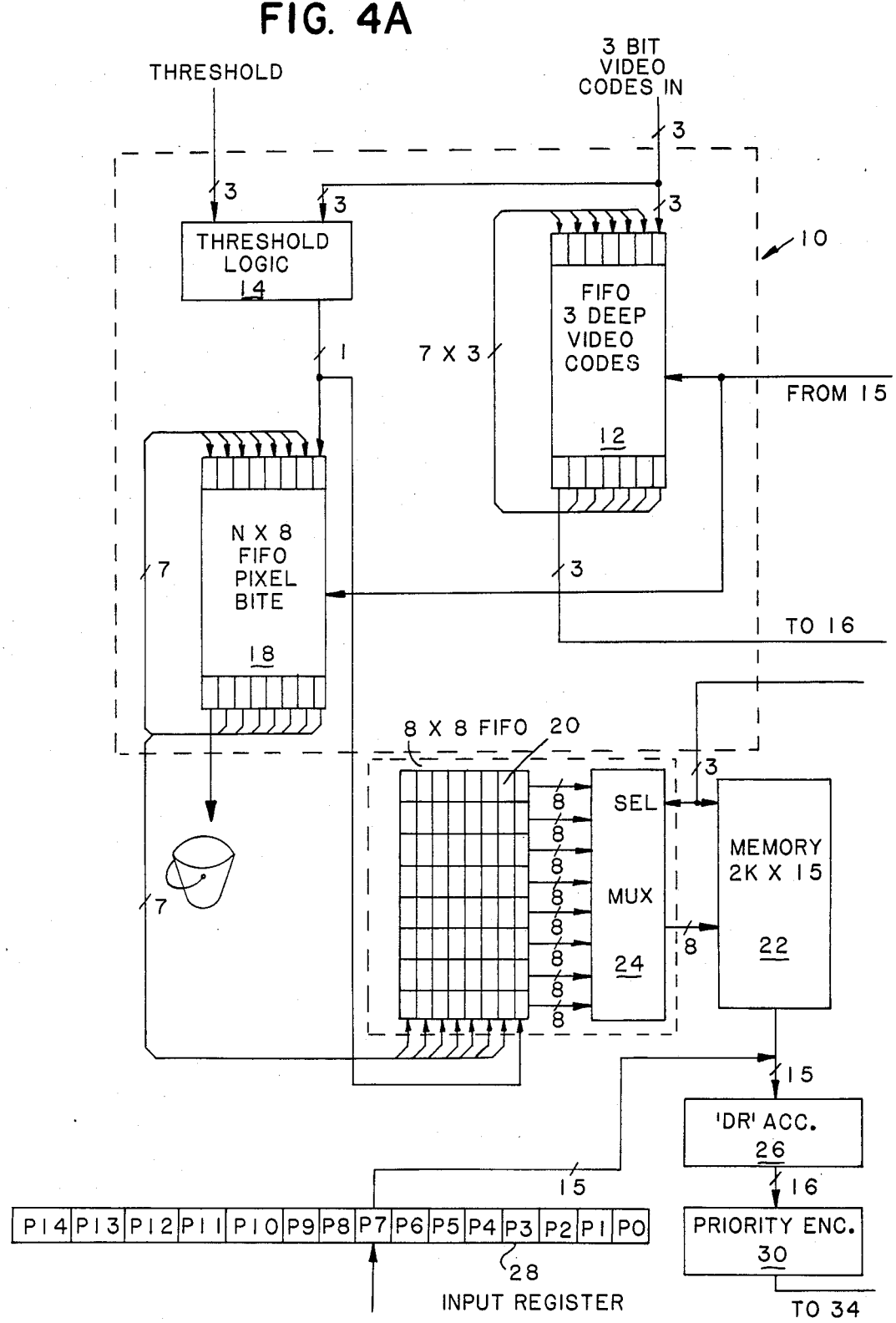
FIGS. 4A and 4B comprise a functional block diagram of apparatus in accordance with a preferred embodiment of the invention.
Figure 4B:
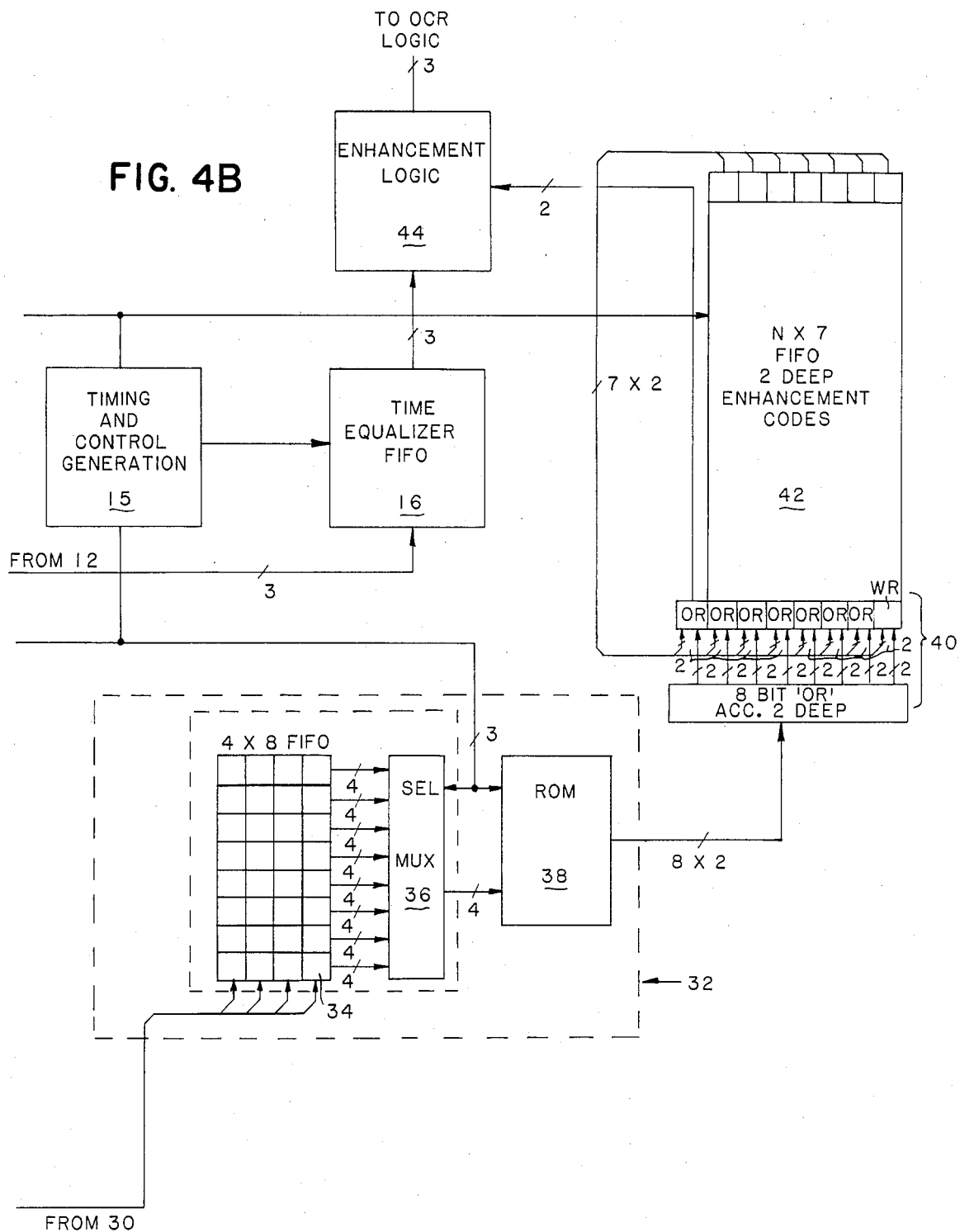

The present invention operates to process, i.e., to perform digital matrix conversion on, the serial stream of three-bit video data provided by the analog-to-digital converter associated with the scanner. In the disclosed embodiment, that processing is for the purpose of removing small artifacts from the input image. A black dot used to define the outline of a guide box for handprint data entry is an example of such a small removable artifact. Thus, referring simultaneously to FIGS. 3 and 4, FIG. 3 being a data flow diagram and FIG. 4 being a functional circuit block diagram, the incoming three-bit data is diverted to a first stage 10 of the enhancement option. First stage 10 includes a delay circuit 12 and threshold logic 14. The delay circuit 12, in one reduction to practice, was a FIFO shift register which holds the incoming data until the enhancement decision has been completed. The three-bit video codes are shifted through FIFO 12, under the control of timing circuit 15, and then outputted to a time equalizer circuit 16 which comprises a further FIFO. The threshold logic circuit 14 comprises, in the example being described, a three-bit magnitude comparator which functions to determine whether the gray scale value of the incoming video data, on a pixel-by-pixel basis, is greater or less than a predetermined threshold value. If the video data is greater than the threshold value, the pixel is determined to be black and the output of logic circuit 14 will be a logic high. If the value of the video data is less than or equal to the threshold, the pixel is determined to be white and the output of the threshold logic circuit 14 will be low. Accordingly, logic circuit 14 converts the incoming three-bit video data to one-bit data.

The output of the threshold logic circuit 14, i.e. the one-bit video data, is loaded into a circular shift register 18 which comprises, in the example being described, a 1×8 FIFO. The contents of the FIFO 18 thus comprise 8-bit words each of which is commensurate with a series of eight pixels. Each time a new one-bit image data word is read into FIFO 18 from the threshold logic 14, an eight-bit word commensurate with a single horizontal row of video data is read out of this storage register in parallel and loaded into a further storage register 20. Register 20 comprises an 8×8×1 FIFO. Referring again to FIG. 2A, the transfer of 8-bit words from FIFO 18 into FIFO 20 effectively creates an 8×8 pixel aperture "A" which shifts through the image. This aperture is schematically illustrated by a broken line showing on FIG. 2A and will hereinafter be referred to as the enhancement aperture. It is to be noted that, in the decision making process to be described below, each pixel will participate in the enhancement, i.e., conversion, decision for itself 64 times. However, each pixel is actually used 4096 times in the overall decision making process. This, in part, results from the fact that the feedback path for FIFO 18 restores, i.e., saves, the column data when the 8-bit words are read into register 20.

The next step in the practice of the disclosed embodiment of the present invention comprises pattern detection. To this end, the 8×8 bit block of video data, i.e., the enchancement aperture or matrix, is broken down into 8 8-bit bytes. Each of these bytes is used as an address to a ROM (Read Only Memory) which is indicated at 22. Memory 22 has 0 to 255×8 addresses to handle the full 64 bit address ranges of the 8 bytes. This encompasses all 256 possible combinations of video data for each byte and provides a lookup capability for every possible combination of video data in an 8×8 block. Thus, each output of register 20 effectively addresses a separate programmed read only memory (PROM) having 0–255 addresses. Memory 22 determines the number of patterns that can be stored for matching. As will be described in more detail below, in one reduction to practice bit 0 at addresses 0 through 255 in all eight separately addressable memory portions represented one pattern for matching. Bit 1 stored a second pattern, etc. Thus, an eight-bit wide memory portion stores eight patterns. The combination of 8×256 bits (2048) is used to establish whether or not a specific 8×8 video pattern produces a match.

Continuing to discuss the embodiment wherein video data is to be enhanced by removal of a dot pattern, FIGS. 5A through 5D represent a subset of sample patterns which are to be matched. The bit position selected for a particular pattern is set to "0" at all addresses in memory 22 which correspond to the video data to be matched. A "1" is set in the bit position at all other addresses. In calculating the addresses for a match, if a white pixel is wanted, the bit for the corresponding address is set to "0". If black is wanted, the bit for the corresponding address is set to "1". If either black or white is acceptable, then two addresses are generated, one for white and a second for black. In operation, the eight bytes of video data are sent to the eight separately addressable portions of memory 20 as addresses via a multiplexer 24. The eight responses which are read back from these addresses are OR'd together in logic circuit 26. If the resulting bit position for a particular pattern contains a "0", a match has occured. If the bit position contains a "1", no match has occurred. In order to selectively enable different patterns, a ninth word is added to the OR operation. This ninth word, provided by a programmable input register 28 at the beginning of each image, contains 0's in bit positions corresponding to the patterns wanted, and 1's in bit positions corresponding to patterns not wanted. This will force a no match condition for all disabled patterns. The wanted and not wanted patterns are determined by the particular application, i.e., by the intended use of the image.

The output of logic circuit 26 is a sixteen bit answer which is delivered to an encoder 30. The encoder converts the sixteen bit answer to a four bit pattern code. If the ORing operation has produced a match with more than one pattern, encoder 30 will decide which match to use since only one enhancement decision may be used at a time. It is to be noted that at least one enhancement decision will be used with "don't take any action" being the default decision.

To describe the pattern matching operation in greater detail, after each pixel enters the process queue, the content of the enhancement aperture is inspected to determine if it "matches" any of the defined patterns, i.e., the system looks for a match. In the embodiment being described, the matching will comprise a comparison with up to sixteen patterns. Restated, the content of the enhancement aperture is compared with "desired" pixel patterns comprised of black, white or "don't care" pixels. The result of this inspection is the generation of a four-bit "pattern code" representing the number of the sample pattern with highest priority that "matches" the instantaneous contents of the enhancement aperture. If none of the patterns "match", the pattern code will be 0 which has been reserved to represent the "no match" case. The encoder 28 will output a pattern code each time a new pixel enters the process from threshold logic 14. The storage register 20 is, in effect, a stack of eight eight-bit registers through which data is shifted serially. The registers are individually addressable. The register stack contains the 8×8 pixel subsection of the image, i.e., the enhancement aperture, which is compared with the sample patterns stored in memory 22 to decide if any enhancement action should be taken. The register 20 may thus be referred to as the pattern aperture stack. Each pixel bit enters the pattern aperture as bit 0 of D7 Register 0 and moves through bit 0 of each register until it is "lost" off the top of the stack. One vertical scan line later, the "lost" pixel will be recovered from a random access memory and will reenter the aperture stack as bit 1 of D7 Register 0. This process continues until each pixel has occupied all 64 possible bit positions in the pattern aperture stack. Since each pixel has two possible states, there are $2^{64}$ combinations possible for each 8×8 matrix. The addresses for register 20 are generated in sequence by timing control circuit 15 to retrieve the content of each "register" and apply it as the least significant eight bits of the address of a separately addressable portion of memory 22. These eight bits of address data will be referred to hereinafter as the aperture line data. The signals used to address the pattern aperture stack are also used as the most significant three bits of an address for memory 22. Since each "register" in the pattern aperture stack contains eight horizontally adjacent image pixels, the stack address may be thought of as an aperture horizontal line select address.

Each output bit of memory 22 represents a particular pattern. These patterns are prioritized such that when any match is found with a particular pattern, matches with patterns of lower priority are ignored. Since memory 22 has 15 outputs, up to 16 patterns may be represented. The least significant output bit from memory 22 will represent a special case pattern called "No Match". This "No Match" pattern has the lowest priority, will match any possible pixel arrangement in the enhancement aperture and is used as the default pattern when no other patterns match the contents of the aperture. When the only pattern that matches the contents of the aperture is the "No Match" pattern, nothing is done to any of the pixels in the aperture.

As noted above, the aperture line data from the pattern aperture stack is employed as the eight least significant bits of address for memory 22 and the stack address is employed as the three most significant address bits. Each of the patterns memorized for matching contains eight lines of eight pixels. FIG. 6 represents how wanted patterns are converted to PROM addresses with the separately addressable portions of memory 22 being indicated as 0-7. The stack address indicates which of the eight lines is being asserted as aperture line data. When the aperture line data contains an arrangement of bits that is appropriate for that line of a pattern, a logic low is outputted from the PROM output pin representing that pattern, otherwise the PROM output is high. This scheme allows each line of the pattern to have multiple definitions. In fact, the entire line can be made a "don't care" by programming the PROM to have a low stored in the pattern bit at all addresses having that line address as the upper three bits of the address. The "No Match" pattern is done this way by storing a low so that any pixel pattern on any line will produce a "match". The allowance for "don't care" pixels to produce a pattern match, i.e., either black or white, provides the capability of combining discrete patterns resulting in a receptor of $3^{64}$ pattern match choices.

A pattern "match" is detected by the following sequence. Aperture line data and the stack address are applied to the pattern PROM (memory 22) address lines. If the aperture line data "matches" a pixel arrangement for that line address, the PROM output will be low. This low is stored in an accumulator in logic circuit 26 and another line of data with its address is applied to the PROM. If this line also "matches", the PROM output will again be low. This result is "OR"ed with the bit in the accumulator and the result of the "OR" is stored in the accumulator. This process is repeated for the remaining six lines in the aperture. If all eight lines were "matches", the accumulator will contain a low indicating that the aperture contents "match" the pattern. If any of the lines do not contain data "matching" the desired pixel arrangement, the PROM output will be high for that line, the high will be "OR"ed into the accumulator and the accumulator will contain a high indicating that the contents of the aperture does not match this pattern. Once any one of the lines does not match, the high "OR"ed into the accumulator causes the accumulator to remain high regardless of the result of the comparison for any remaining lines. All eight lines must produce a low output from the PROM in order for the accumulator to contain a low to indicate a pattern match.

As briefly discussed above, in addition to the PROM output, a pattern enable mask bit is "OR"ed into the accumulator from input register 28. The detection of each pattern can be individually enabled or disabled by the system software which must write the state of the mask bits into the pattern enable register. When the mask bit is high, the pattern detection is disabled since "OR"ing the high into the accumulator causes a "No Match" for this pattern condition no matter what results are obtained by comparing the enhancement aperture line data with the stored patterns. When the enable mask bit is low, the pattern detection is enabled. FIG. 7 represents the addressing of memory 22 and the pattern match result.

The results, outputted from the "OR" accumulator of logic circuit 26 are, as noted above, applied to a priority encoder 30. The priority encoder generates a four-bit pattern code representing the highest priority pattern found to match the contents of the aperture. These pattern codes are used, as represented schematically at 32 on FIG. 3, for the purpose of retrieving eight groups of eight two-bit enhancement codes. Thus, there are 64 opportunities to enhance each pixel. As will be described below, the arrangement of enhancement codes will automatically disable the enhancement operation any time a conflicting decision is made at a particular pixel. FIGS. 8A-8D represent a subset of the enhancement patterns which will be generated in accordance with the embodiment of the invention being described in order to remove the handprint guide box defining dots represented respectively by FIGS. 5A-5D.

The enhancement code for a particular pixel will be the result of bit wise "OR"ing 64 enhancement codes together, one code for each position of the pixel in the enhancement aperture. The enhancement circuitry is substantially the same as that described above with respect to the pattern detection circuit. Thus, referring again to FIG. 4, the four-bit pattern codes provided by encoder 30 are delivered to a four-bit wide register stack 34 which is driven by the same control signals as are applied to register stack 20. The contents of register stack 34, which may comprise two 4×8 FIFO's, are applied via a multiplexer 36 to the enhancement action memory 38. The four-bit wide register stack 34 which receives the pattern codes will hereinafter be referred to as the pattern code stack.

To briefly review the operation of the system, a line of eight pixels loaded into the aperture register stack 20 will be shifted through this stack, occupying the eight registers in the stack, with the detection circuitry producing a pattern code for each of the occupied positions. These pattern codes, as described above, correspond to the patterns that the line in question was a part of for each of its eight line positions in the aperture register stack. The pattern code stack 34 stores this pattern code history for the line in question. This pattern code history is employed, in the manner to be described blow, to determine what enhancement action should be applied to each of the eight bits of the line.

The eight pattern codes are sequentially employed to address enhancement memory 38 in the same manner in which the line data was applied to the pattern memory 22. The pattern codes are used as the four least significant bits of address for enhancement memory 38. The line address, i.e., the same data used to address the aperture register stack 20, is used as the next three more significant address bits for the enhancement memory 38. The line address thus retrieves the pattern codes from the pattern code stack 34 in the same way the aperture line data was accessed in the aperture register stack 20. The line address also identifies to memory 38 the aperture line which produced the pattern code being currently applied.

As briefly noted above, the enhancement action to be applied to a particular pixel is determined by a two-bit enhancement code. In the example being described, bit 0 (B0) being high represents enhance to white while bit 1 (B1) being high represents enhance to black. If both bits are high or both low, then no change is made to the pixel. The following table lists enhancement codes and the enhancement actions which the codes represents.

| | Enhancement Action Codes | |
|---|---|---|
| B1 | B0 | Enhancement Action |
| 0 | 0 | No change |
| 0 | 1 | Force Pixel to white |
| 1 | 0 | Force Pixel to black |
| 1 | 1 | No change |

As mentioned above, the enhancement code for a particular pixel is the result of the bitwise "OR"ing of enhancement codes, one code for each pixel position in the enhancement window. Thus, each "pass" of the pixel through the enhancement window results, in the manner to be described below, in the bitwise "OR"ing of eight enhancement codes. Thus, every pixel effectively "passes" through stack 34 eight times, once in each bit position of the enhancement window, to produce the final enhancement code result which is applied to the pixel.

The "force white" bit of the enhancement code is stored in a first portion of the enhancement memory 38 while the "force black" bit is stored in another portion of the enhancement memory. Each of the eight outputs of each portion of memory 38 corresponds to the column position in the aperture occupied by the pixel for which an enhancement decision is being made.

To briefly summarize, the contents of the pattern code stack 34 are sequentially applied to the enhancement memory portions along with the appropriate line addresses. This results in eight sets of PROM outputs, i.e., eight enhancement decisions for each of eight pixels, which are sequentially "OR"ed into an "OR" accumulator in a logic circuit 40.

The outputs of logic circuit 40 enter an enhancement queue defined by a further group of FIFO's 42. The enhancement queue comprises two planes, one plane for each bit of the enhancement code. Thus, at the end of an accumulation sequence, the output of the "OR" accumulator of logic circuit 40 represents eight enhancement action code bits that have been "OR"ed together. These eight codes are those produced for a pixel that entered the enhancement aperture as bit 0 of aperture register zero of stack 20 and moved upwards through bit 0 of every other register in the aperture register stack. An enhancement command is possible at each of the eight aperture positions. This intermediate enhancement result is placed in the first FIFO of register stack 42.

One scan line later, when the data commensurate with the pixel in question is recovered and enters the aperture register stack in bit 1 of register 0, another eight enhancement action code bits will be generated as the pixel is shifted upwards through the aperture stack. Thus, eight more enhancement codes will be accumulated in the enhancement "OR" accumulator of logic circuit 40. These second eight bits will be stored in bit position one. The original intermediate enhancement result will at this time be retrieved from the enhancement queue and "OR"ed with the accumulator output in bit position one to produce a new intermediate result consisting of 16 individual enhancement decisions. This new intermediate result is then written back to a random access memory in logic circuit 40 in bit position 1, which corresponds to entering the second of the FIFO's of register stack 42.

The above-described process continues until all sixty-four enhancement decisions, one for each pixel position in the enhancement aperture, have been accumulated. At this time the final enhancement decision is available from accumulator 40. This final enhancement decision code is delivered to enhancement logic circuit 44. At the same time, under the control of circuit 15, the delayed three bit video data is also supplied to enhancement logic 44 from the time equalizer register 16. The three bits of video data will, in logic circuit 44, be affected by the condition of the enhancement code inputs from logic circuit 40. Thus, when the enhancement code is either of the two "No Change" codes, the pixel data is clocked into an output register unmodified. However, if the enhancement code is "Force Pixel to White", the input pixel data will be ignored and a value of 0 clocked into the output register to produce a white output pixel. Conversely, when the enhancement action code is "Force Pixel to Black", a value of seven (111) is substituted for the input pixel data, thus clocking a black pixel into the output register of logic circuit 44.

To briefly summarize the enhancement operation, if one or more patterns are matched, then the highest of the matched pattern numbers as provided at the output of encoder 30 is used as an address to each of four separately addressable portions of memory 38 to retrieve 8 groups of eight two-bit enhancement codes; i.e., sixty-four codes. The enhancement register stack 42 is arranged as 8 groups of two-bit storage locations. Data is shifted on a first-in, first-out basis. The first 7 groups of enhancement codes are OR'd into the enhancement register stack. The eighth enhancement code is written into register stack 42. If no pattern match is found, then enhancement codes of 00 are written to the eighth group in enhancement shift register stack 42. This results in no enhancement decision being made at that time, i.e., at the completion of one cycle, while still allowing decisions to be made on the seven subsequent cycles. The process allows one completed enhancement decision on each cycle and an enhancement decision, when made, is applied to the corresponding original gray scale video pixel.

Figure 2B:
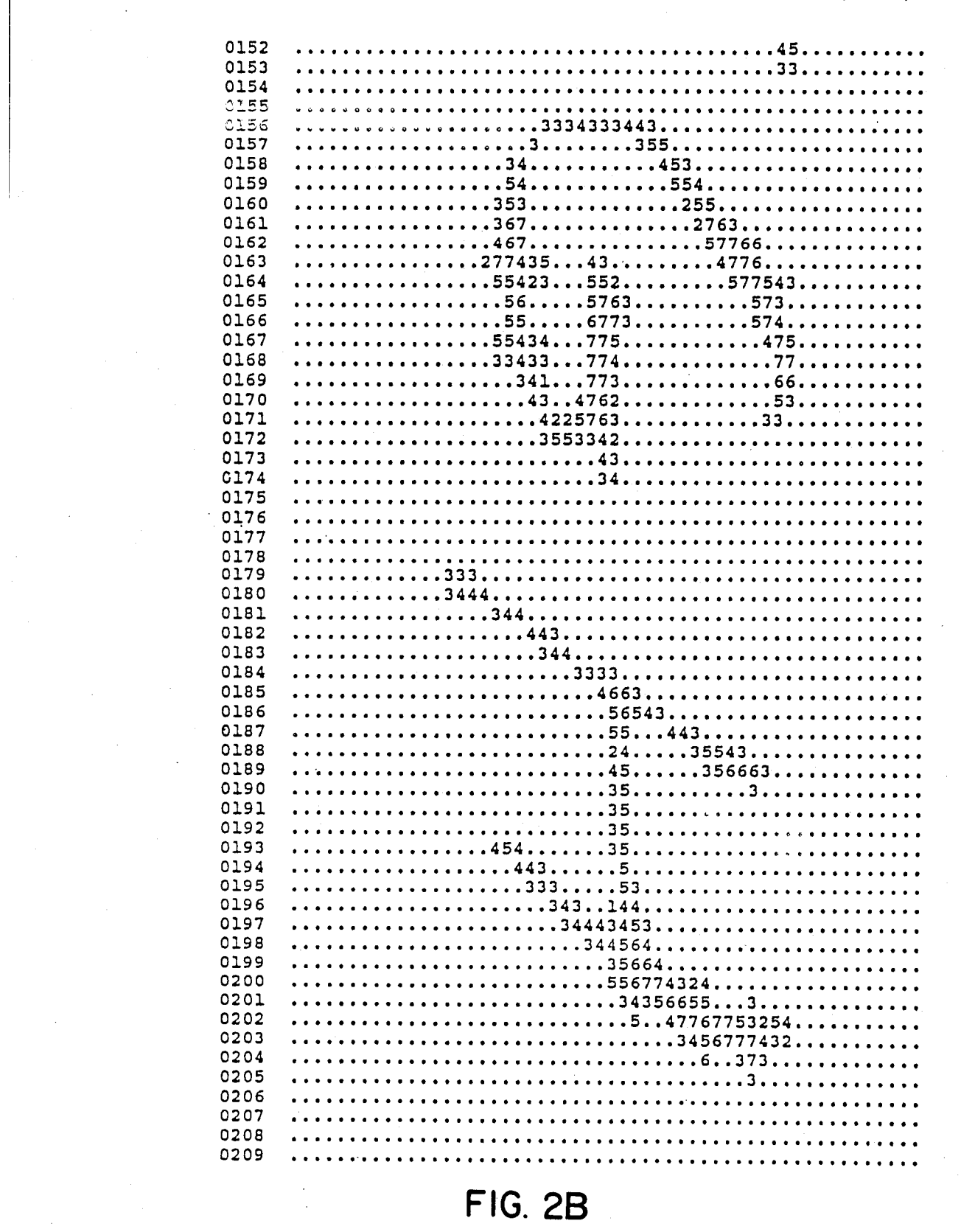

The enhance three-bit video data will be clocked out of the output register in logic circuit 44 and delivered to optical character recognition logic which, as noted above, may be of the type disclosed in U.S. Pat. No. 4,628,532. This enhanced video data will be in the form schematically represented in FIG. 2B if the input video data is as represented in FIG. 2A. By comparison of FIGS. 2A and 2B it may clearly be seen that the technique and apparatus of the present invention may be employed to convert a digital matrix and particularly to enhance a digitized image by removing small artifacts such as handprint guide box defining dots. Those skilled in the art will recognize that the invention may also be employed to enhance the edges of a pattern or to reduce the width of a pattern, i.e., a trace, to a single bit. These capabilities are also clearly seen from a comparison of FIGS. 2A and 2B.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the conversion of a digital matrix, the matrix comprising a predetermined number of rows and columns of digitized data, said method comprising the steps of:
   storing the matrix to be converted;
   storing digital matrices commensurate with a plurality of desired patterns, the desired pattern matricies being commensurate in size with the matrix to be converted;
   storing data commensurate with a plurality of possible conversion actions;
   comparing the matrix to be converted with the stored desired pattern matrices and generating a pattern code commensurate with the results of the comparison;
   providing an output which corresponds to the stored conversion action commensurate with the generated pattern code; and
   modifying the matrix to be converted in accordance with the provided output corresponding to a conversion action.

2. The method of claim 1 wherein the desired patterns each have a priority and wherein the step of comparing comprises:
   generating a pattern code commensurate with the result of the comparison of the matrix to be converted with each of the desired patterns; and
   choosing the pattern code corresponding to the matched desired pattern having the highest priority.

3. The method of claim 1 wherein the matrix to be converted is part of a digitized image and defines an aperture which moves linearly relative to the image, the image being comprised of pixels, and wherein the step of comparing is performed each time the aperture is moved relative to the image a predetermined distance, said predetermined distance being at least the space occupied by one pixel, a pattern code thus being generated for each position a given pixel occupies in the aperture.

4. The method of claim 3 wherein the step of providing an output comprises:
   storing the pattern codes commensurate with each position of a pixel in the aperture;
   identifying one of the stored conversion actions for each pixel position; and
   combining the identified conversion actions for each pixel position to produce a single conversion action decision for each pixel.

5. The method of claim 4 wherein the digitized image is comprised of numerical data associated with each pixel and wherein the step of modifying comprises:
   adjusting the numerical data for each pixel in accordance with the conversion action decision.

6. The method of claim 5 wherein the step of storing data commensurate with possible conversion actions comprises:
   memorizing codes corresponding to increasing, decreasing and not changing the pixel associated numerical data.

7. The method of claim 6 wherein the desired patterns have a priority and wherein the step of comparing comprises:
   generating a pattern code commensurate with the results of the comparison of the data comprising the aperture with each of the desired patterns after each move of the aperture;
   choosing the pattern code corresponding to the desired pattern code having the highest priority if plural patterns are matched during the comparisons; and
   choosing a pattern code commensurate with a no match condition if none of the desired patterns have been matched.

8. An enhancement technique for an image consisting of pixels comprising the steps of:
   digitizing an image to be enhanced, the digitized image comprising rows and columns of words, each word being commensurate with a numerical value corresponding to each pixel of the image;
   storing the digitized image in unaltered form;
   storing a digital matrix of data commensurate with a portion of the image, the stored matrix corresponding to an aperture which moves relative to the image, the stored matrix being updated in synchronism with the storing of digitized pixels comprising the image;
   storing digital matricies corresponding to desired patterns, the stored desired pattern matricies each occupying memory locations commensurate in number with the number of pixels comprising the moving aperture;
   comparing the stored matrix corresponding to the aperture with each of the desired pattern matricies and generating pattern codes indicative of the results of the comparisons;
   storing a plurality of pattern code related enhancement decisions;
   selecting stored enhancement decisions which correspond to the generated pattern codes, an enhancement decision being selected for each position of a pixel in an aperture;
   combining the selected enhancement decisions to produce a single enhancement action code for each pixel of the image; and
   modifying the stored image pixel-by-pixel as a function of the produced enhancement action code.

9. The method of claim 8 wherein the desired patterns each have a priority and wherein the step of comparing comprises:
   generating a pattern code commensurate with the results of the comparison of the data comprising the aperture after each move thereof with each of the desired patterns;
   choosing the pattern code corresponding to the desired pattern having the highest priority if plural patterns are matched; and
   choosing a pattern code commensurate with a no match condition if none of the desired patterns have been matched.

10. The method of claim 8 wherein the step of selecting comprises:
    storing the pattern codes commensurate with each position of a pixel in the aperture;
    identifying one of the stored enhancement decisions for each pixel position; and
    combining the identified enhancement decisions for each pixel position to produce a single enhancement action code for each pixel.

11. The method of claim 9 wherein the step of selecting comprises:
    storing the pattern codes commensurate with each position of a pixel in the aperture;
    identifying one of the stored enhancement decisions for each pixel position; and
    combining the identified enhancement decisions for each pixel position to produce a single enhancement action code for each pixel.

12. Apparatus for converting a digital matrix, the matrix comprising a predetermined number of rows and columns of image pixel intensity data, the number of pixels represented in each column and row also being predetermined, said apparatus comprising:
    first register means for storing the data commensurate with the matrix to be converted;
    first memory means for storing matricies commensurate with a plurality of desired conversion patterns, the conversion patterns each being comprised of the same number and arrangement of pixel intensity data as the matrix to be converted;
    means for comparing the stored data matrix to be converted with each of the conversion patterns in said first memory means, said comparing means generating pattern codes representing the results of each comparison;
    second memory means for storing codes commensurate with a plurality of conversion decisions;
    means for addressing said second memory means with said pattern codes to read conversion decision codes commensurate with said pattern codes from said second memory means;
    means for combining the conversion decision codes read from said second memory means to produce a single decision code for each pixel of the matrix to be converted; and
    means for modifying the matrix to be converted pixel-by-pixel as a function of the decision codes produced by said combining means.

13. The apparatus of claim 12 wherein the matrix to be converted is a portion of a digitized image, the image being scanned such that the matrix to be converted is periodically updated by the storage of data commensurate with a newly scanned pixel, data corresponding to each pixel being shifted through said first register means so as to occupy each position in the matrix, and wherein said comparing means operates on the data in said first register means for each position of the pixel in the matrix.

14. The apparatus of claim 13 wherein said conversion patterns are assigned priorities and said comparing means generates a plurality of pattern codes for each comparison with the matrix to be converted, the number of generated codes being commensurate with the number of patterns matched, and wherein said apparatus further comprises:

means for selecting the pattern code commensurate with the highest priority conversion pattern matched.

15. The apparatus of claim 14 wherein said means for addressing comprises:

second register means, said second register means receiving and storing a selected pattern code commensurate with each position of a pixel in the matrix to be converted; and means for applying the codes stored in said second register means as addresses for said second memory means whereby a conversion decision code will be read from said second memory means for each position of a given pixel in the matrix.

16. The apparatus of claim 12 wherein the digital matrix comprises a portion of a digitized image and the intensity data for each pixel consists of numerical data commensurate with the degree of darkness of the pixel relative to a background, and wherein said apparatus further comprises:

means for receiving and delaying the digitized image in unaltered form, said receiving means delivering said unaltered image to said means for modifying in synchronism with the production of said single decision codes by said combining means.

17. The apparatus of claim 15 wherein the digital matrix comprises a portion of a digitized image and the intensity data for each pixel consists of numerical data commensurate with the degree of darkness of the pixel relative to a background, and wherein said apparatus further comprises:

means for receiving and delaying the digitized image in unaltered form, said receiving means delivering said unaltered image to said means for modifying in synchronism with the production of said single decision codes by said combining means.

* * * * *